United States Patent [19]

Agano et al.

[11] Patent Number: 4,897,546

[45] Date of Patent: * Jan. 30, 1990

[54] RADIATION IMAGE RECORDING, READ-OUT AND REPRODUCING APPARATUS

[75] Inventors: Toshitaka Agano; Yoshihiko Okamoto, both of Kanagawa, Japan

[73] Assignee: Fuji Photo Film Co., Ltd., Kanagawa, Japan

[*] Notice: The portion of the term of this patent subsequent to Sep. 5, 2006 has been disclaimed.

[21] Appl. No.: 143,474

[22] Filed: Jan. 13, 1988

[30] Foreign Application Priority Data

Jan. 13, 1987 [JP] Japan .................................. 62-5264
Oct. 20, 1987 [JP] Japan .................................. 62-265013

[51] Int. Cl.[4] .................. G01N 23/04; B65H 5/00; B65H 7/00
[52] U.S. Cl. .............................. 250/327.2; 250/484.1
[58] Field of Search ........... 250/484.1, 327.2, 327.2 E, 250/327.2 F, 327.2 J, 327.2 H, 327.2 K; 358/302

[56] References Cited

U.S. PATENT DOCUMENTS

| 4,012,585 | 3/1977 | Chen .................... 358/302 |
| 4,015,081 | 3/1977 | Starkweather .................... 358/302 |
| 4,258,264 | 3/1981 | Kotera et al. .................... 250/327.2 |
| 4,276,473 | 6/1981 | Kato et al. .................... 250/327.2 |
| 4,315,318 | 2/1982 | Kato et al. .................... 250/337 |
| 4,387,428 | 6/1983 | Ishida et al. .................... 250/337 |
| 4,400,619 | 8/1983 | Kotera et al. .................... 250/327.2 |
| 4,527,060 | 7/1985 | Suzuki et al. .................... 250/327.2 |
| 4,543,479 | 9/1985 | Kato .................... 250/327.2 K |
| 4,578,582 | 3/1986 | Takano .................... 250/327.2 |
| 4,636,641 | 1/1987 | Mori et al. .................... 250/327.2 |
| 4,687,932 | 8/1987 | Tamura et al. .................... 250/327.2 K |
| 4,723,151 | 2/1988 | Sonezaki et al. .................... 355/27 |

FOREIGN PATENT DOCUMENTS

| 182095 | 11/1978 | European Pat. Off. . |
| 11395 | 2/1981 | Japan .................................. 250/327.2 |
| 58-184677 | 10/1983 | Japan . |
| 61-147244 | 7/1986 | Japan . |
| 0223723 | 10/1986 | Japan . |
| 2079962 | 3/1971 | United Kingdom . |

OTHER PUBLICATIONS

*Fuji Computed Radiography CR201,* technical brochure by Fuji Photo Film Co., 1985.
IBM Technical Disclosure Bulletin, vol. 15, No. 10, Mar. 1983, R. A. Thorpe "Triple Function Box".

*Primary Examiner*—Janice A. Howell
*Assistant Examiner*—William F. Rauchholz
*Attorney, Agent, or Firm*—Sughrue, Mion, Zinn, Macpeak & Seas

[57] ABSTRACT

A radiation image recording, read-out and reproducing apparatus comprises a system for circulating and conveying stimulable phosphor sheets, a section for feeding recording sheets, a section for recording a radiation image on the stimulable phosphor sheet, a scanning section, an erasing section, and a system for conveying the recording sheet from the recording sheet feeding section to the scanning section and then out of the scanning section. The scanning section comprises a read-out main scanning system for scanning light in a main scanning direction on the stimulable phosphor sheet, a reproducing main scanning system for scanning light in the main scanning direction on the recording sheet, and a sub-scanning system for moving the stimulable phosphor sheet and the recording sheet in a sub-scanning direction, thereby to carry out both the image read-out from the stimulable phosphor sheet and the image reproduction on the recording sheet.

5 Claims, 4 Drawing Sheets

RADIATION IMAGE RECORDING, READ-OUT AND REPRODUCING APPARATUS

BACKGROUND OF THE INVENTION

1. Field of the Invention

This invention relates to a radiation image recording, read-out and reproducing apparatus wherein read-out and reproduction of a radiation image are carried out by use of the same scanning system in the same apparatus, and at least one stimulable phosphor sheet is circulated and reused in the apparatus.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Publication Pat. No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to electric image signals, which are processed as desired to reproduce a visible image having an improved image quality, particularly a high diagnostic efficiency and accuracy. The visible image finally obtained may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for carrying out the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desirable to load the mobile X-ray diagnostic station with stimulable phosphor sheets which can be used repeatedly, and circulate and reuse the stimulable phosphor sheets for further image recording and read-out operations, thereby obtaining the radiation image signals of many objects. Further, when image recording is carried out continuously by circulating and reusing the stimulable phosphor sheets, it becomes possible to increase the image recording speed in mass medical examination. This is very advantageous in practical use.

In order to reuse stimulable phosphor sheets as mentioned above, the radiation energy remaining on the stimulable phosphor sheet after it is scanned with stimulating rays to read out the radiation image stored thereon should be erased by a method as described in, for example, U.S. Pat. No. 4,400,619 or Japanese Unexamined Publication Pat. No. 56(1981)-12599. The stimulable phosphor sheet should then be used again for radiation image recording.

From the aforesaid viewpoint, the applicant proposed in Japanese Unexamined Publication Pat. No. 59(1984)-192240 a built-in type radiation image recording and read-out apparatus comprising:

(i) a circulation and conveyance means for conveying at least one stimulable phosphor sheet for recording a radiation image thereon along a predetermined circulation path, (ii) an image recording section disposed on the circulation path for recording a radiation image of an object on the stimulable phosphor sheet by exposing the stimulable phosphor sheet to a radiation passing through the object, (iii) an image read-out section disposed on the circulation path and provided with a stimulating ray source for emitting stimulating rays for scanning the stimulable phosphor sheet carrying the radiation image stored thereon at the image recording section, and a photoelectric read-out means for detecting light emitted by the stimulable phosphor sheet scanned with the stimulating rays to obtain electric image signals, and (iv) an erasing section disposed on the circulation path for, prior to the next image recording on the stimulable phosphor sheet for which the image read-out has been carried out at the image read-out section, having the stimulable phosphor sheet release the radiation energy remaining on the stimulable phosphor sheet, whereby the stimulable phosphor sheet is circulated through the image recording section, the image read-out section and the erasing section, and reused for radiation image recording.

On the other hand, the image signals detected in the manner as mentioned above may be stored on a storage medium having a large storage capacity, such as a magnetic tape, and used for reproducing a visible image on a recording sheet or the like at a location remote from the built-in type apparatus, or may be used for reproducing a visible image on a recording sheet or the like immediately after the image read-out. In any case, in order to reproduce the radiation image, which was recorded on the stimulable phosphor sheet, on the recording sheet, it is necessary to provide a reproducing apparatus for scanning a light beam modulated in accordance with the detected image signals on the recording sheet. Therefore, in order to form the final visible image of the radiation image, which was stored on the stimulable phosphor sheet, on the recording sheet in the conventional radiation image recording and reproducing system, it is necessary to provide at least two independent apparatuses, i.e. the aforesaid built-in type apparatus and the reproducing apparatus.

In recent years, various attempts have been made to make the aforesaid radiation image recording and reproducing system as a whole smaller and to reduce the manufacturing cost of the system. However, with the conventional radiation image recording and reproducing system, the recording and read-out apparatus and the reproducing apparatus must be provided independently of each other as mentioned above, and the system as a whole cannot be made so small.

In particular, the built-in type apparatus is suitable for loading on a mobile X-ray diagnostic station such as a traveling X-ray diagnostic station in the form of a vehicle like a bus for the purpose of mass medical examinations or the like as mentioned above and should preferably be made as small as possible. However, in the case where a radiation image is to be reproduced into a visible image immediately after the radiation image is recorded and read out, the mobile X-ray diagnostic station must be loaded with both the recording and read-out apparatus and the reproducing apparatus, and therefore becomes larger as a whole. Also, a scanning system including a light source and other components must be provided independently in the image read-out section of the recording and read-out apparatus and the reproducing apparatus respectively and therefore the manufacturing cost of the radiation image recording and reproducing system cannot be reduced markedly.

Also, though an X-ray image read-out and reproducing apparatus wherein the same light source is utilized for read-out and reproduction, and read-out and reproduction are carried out alternately in the same stage is proposed in Japanese Unexamined Publication Pat. No. 58(1983)-184677, only a conceptual view of the apparatus is shown in the specification thereof and no concrete configuration of the apparatus is described therein. Therefore, it is not always possible to put such an apparatus into practical use. Also, with the proposed apparatus, scanning is carried out by moving the light source and a photodetector with respect to a sheet. With such a scanning method, the movement mechanism becomes complicated and it is not always possible to achieve quick scanning. Further, with the proposed apparatus wherein a light modulator and the photodetector are moved by a drive mechanism into and out of an optical path in the course of change-over of the apparatus between read-out and reproduction, the apparatus is also rendered complicated by the drive mechanism.

SUMMARY OF THE INVENTION

The primary object of the present invention is to provide a radiation image recording, read-out and reproducing apparatus wherein radiation image read-out and reproduction are carried out by use of the same scanning system in a built-in type apparatus.

Another object of the present invention is to provide a radiation image recording, read-out and reproducing apparatus which makes a radiation image recording and reproducing system smaller as a whole, and reduces the manufacturing cost of the radiation image recording and reproducing system by forming the conventional recording and read-out apparatus and the conventional reproducing apparatus integrally with each other.

The present invention provides a radiation image recording, read-out and reproducing apparatus which comprises:

(i) a circulation and conveyance means for conveying at least one stimulable phosphor sheet along a predetermined circulation path, (ii) a recording sheet feeding section for housing recording sheets and feeding out said housed recording sheets one by one, (iii) an image recording section disposed on said circulation path for recording a radiation image on said stimulable phosphor sheet by exposing said stimulable phosphor sheet to a radiation carrying image information, (iv) a light beam scanning section disposed on said circulation path and provided with a read-out main scanning means for deflecting a light beam by a light deflector and scanning said light beam in a main scanning direction on said stimulable phosphor sheet, a reproducing main scanning means for deflecting a light beam by a light deflector and scanning said light beam in the main scanning direction on said recording sheet, and a sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out, (v) an erasing section disposed on said circulation path for, prior to the next image recording on said stimulable phosphor sheet for which the image read-out has been carried out at said light beam scanning section, having said stimulable phosphor sheet release the radiation energy remaining on said stimulable phosphor sheet, and (vi) a recording sheet conveyance means for receiving said recording sheet fed out of said recording sheet feeding section, conveying said recording sheet to said light beam scanning section, and thereafter conveying said recording sheet out of said light beam scanning section in a direction different from the direction of conveyance of said circulation and conveyance means.

The read-out main scanning means and the reproducing main scanning means at the light beam scanning section may be common to each other in whole or in part.

With the radiation image recording, read-out and reproducing apparatus in accordance with the present invention wherein a recording and read-out apparatus and a reproducing apparatus which have heretofore been provided independently of each other are formed integrally with each other by carrying out both the image read-out and the reproduction by use of the same sub-scanning system, the radiation image recording and reproducing system as a whole can be made markedly smaller than the conventional radiation image recording and reproducing system. Also, the radiation image recording, read-out and reproducing apparatus in accordance with the present invention can be loaded on a mobile X-ray diagnostic station such as a traveling X-ray diagnostic station in the form of a vehicle like a bus for the purpose of mass medical examinations or the like in the same manner as the conventional recording and read-out apparatus. Therefore, the radiation image read out from the stimulable phosphor sheet can be immediately reproduced on the recording sheet, and the results of image recording can be found quickly. This is very advantageous in practice. Also, with the radiation image recording, read-out and reproducing apparatus in accordance with the present invention wherein at least the sub-scanning means is utilized for both image read-out and reproduction, only a single sub-scanning means may be provided, and the manufacturing cost of the overall radiation image recording and reproducing system can be reduced. In the case where the light deflector of the main scanning means, the light source for producing the light beam and other components are also utilized for both image read-out and reproduction, the manufacturing cost of the overall radiation image recording and reproducing system can further be reduced. Also, in the case where a part of the conveyance means for the stimulable phosphor sheet and a part of the recording sheet conveyance means are utilized in common, the overall radiation image recording and reproducing system can be made smaller and the cost thereof can be made lower.

DESCRIPTION OF THE PREFERRED EMBODIMENTS

The present invention will hereinbelow be described in further detail with reference to the accompanying drawings.

Figure 1:
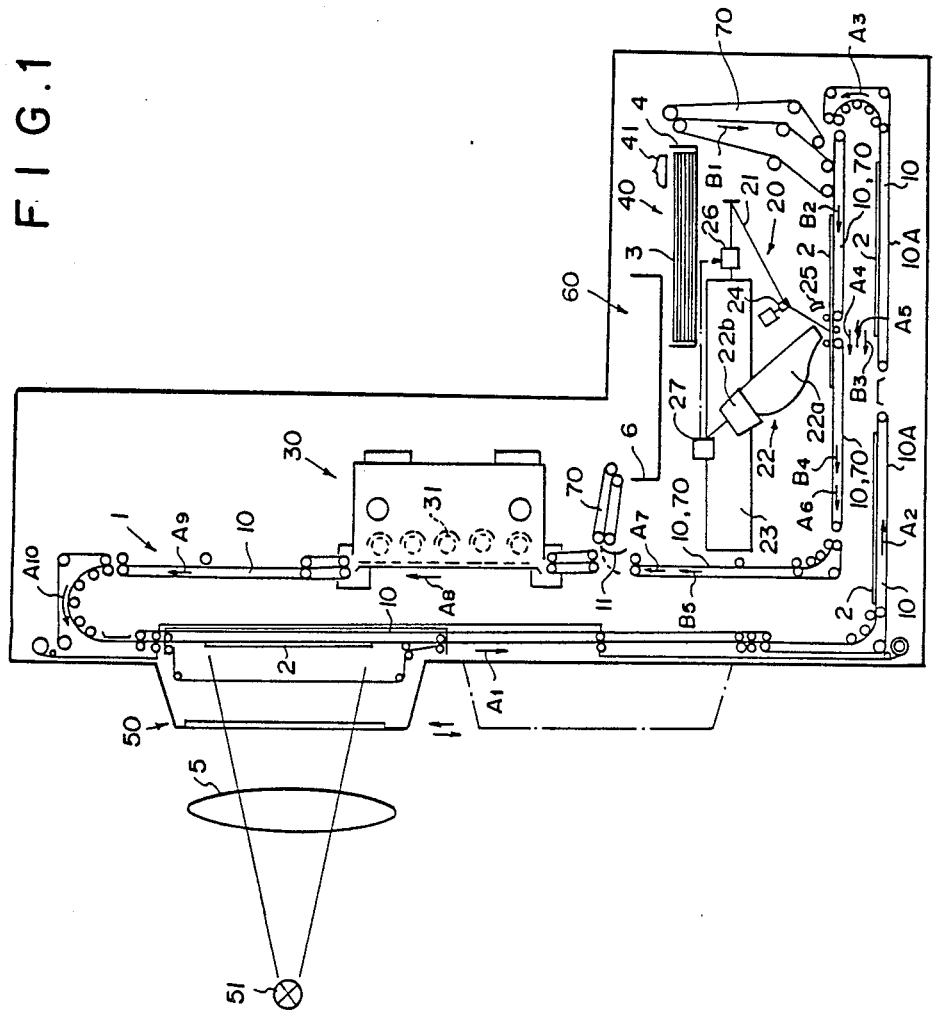
FIG. 1 is a schematic side view showing an embodiment of the radiation image recording, read-out and reproducing apparatus in accordance with the present invention.

With reference to FIG. 1, an embodiment of the radiation image recording, read-out and reproducing apparatus in accordance with the present invention is provided with a circulation path 1, and a stimulable phosphor sheet 2 is conveyed and circulated by a circulation and conveyance means 10 composed of endless belts, rollers, guide plates and the like along the circulation path 1. Also, the apparatus is provided with a recording sheet feeding section 40 for releasably holding a recording sheet feeding magazine 4 capable of housing a plurality of recording sheets 3, 3, formed of silver halide film or the like therein. On the circulation path 1, an image recording section 50 for recording a radiation image on the stimulable phosphor sheet 2, a light beam scanning section 20 for reading out a radiation image stored on the stimulable phosphor sheet 2 and reproducing the radiation image thus read out on the recording sheet 3, and an erasing section 30 for carrying out erasing for releasing radiation energy remaining on the stimulable phosphor sheet 2 after image read-out therefrom is finished at the light beam scanning section 20 are disposed sequentially in the direction of conveyance of the stimulable phosphor sheet 2. In the apparatus, a plurality of the stimulable phosphor sheets 2, 2, are conveyed and circulated by the circulation and conveyance means 10 sequentially through the image recording section 50, the light beam scanning section 20, and the erasing section 30.

At the image recording section 50, a radiation produced by a radiation source 51 passes through an object 5 and impinges upon the stimulable phosphor sheet 2, so that a radiation image of the object 5 is recorded and stored on the stimulable phosphor sheet 2. By way of example, four stimulable phosphor sheets 2, 2, are conveyed and circulated in the apparatus, and are sequentially sent to the image recording section 50 for recording a radiation image thereon. The image recording section 50 is moveable vertically between the position as indicated by the solid line and the position as indicated by the broken line in accordance with the object 5.

After the image recording is finished for the stimulable phosphor sheet 2, the stimulable phosphor sheet 2 is conveyed by the circulation ad conveyance means 10 in the directions as indicated by the arrows A1, A2 and A3 along the circulation path 1 to the light beam scanning section 20.

As for the stimulable phosphor sheet 2, the light beam scanning section 20 is operated for scanning the stimulable phosphor sheet 2 carrying a radiation image stored thereon by a laser beam 21 as stimulating rays which cause the stimulable phosphor sheet 2 to emit light in proportion to the stored radiation energy, and photoelectrically detecting the emitted light by a photoelectric readout means 22 constituted by a photomultiplier or the like to obtain electric image signals for use in reproduction of a visible image. Reference numeral 23 denotes a He-Ne laser beam source, and reference numeral 24 denotes a light deflector such as a galvanometer mirror. Reference numeral 25 designates a reflection mirror for reflecting the light emitted by the stimulable phosphor sheet 2 towards a light guide member 22a of the photoelectric read-out means 22. The light guide member 22a guides the light through total reflection therein up to a photodetector 22b constituted by a photomultiplier or the like. Reference numeral 26 denotes a light modulator such as an acousto-optic modulator (AOM), which is not activated when the laser beam 21 scans the stimulable phosphor sheet 2.

The stimulable phosphor sheet 2 sent to the light beam scanning section 20 is conveyed by the circulation and conveyance means 10 in the direction as indicated by the arrow A4, and the overall surface of the stimulable phosphor sheet 2 is scanned two-dimensionally by the laser beam 21 deflected approximately normal to the conveyance direction. The light emitted by the stimulable phosphor sheet 2 in the course of the scanning is detected by the photodetector 22b via the light guide member 22a. The photodetector 22b converts the detected light into electric signals, which are then sent to an image processing circuit 27 for carrying out image processing on the electric signals, and stored in a memory 29.

As for the radiation image read-out, there has heretofore been known a method wherein preliminary read-out for approximately ascertaining the radiation image stored on the stimulable phosphor sheet 2 is carried out prior to the aforesaid image read-out (final read-out) for obtaining electric image signals for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Publication Pat. No. 58(1983)-67240, the preliminary read-out may be conducted by scanning the stimulable phosphor sheet 2 with stimulating rays having stimulation energy of a level lower than the level of the stimulation energy of the laser beam (stimulating rays) used in the final read-out, and detecting the light emitted by the stimulable phosphor sheet 2 in the course of the scanning by a photoelectric read-out means.

The light beam scanning section 20 may be constituted to carry out only the final read-out or both the preliminary read-out and the final read-out. For example, the preliminary read-out may be carried out by conveying the stimulable phosphor sheet 2 in the direction as indicated by the arrow A4, the stimulable phosphor sheet 2 may then be switched back and reversely conveyed in the direction as indicated by the arrow A5 to the read-out start position, and then the final read-out may be carried out while the stimulable phosphor sheet 2 is again conveyed in the direction as indicated by the arrow A4. The optical members at the light beam scanning section 20 are not limited to those as mentioned above. For example, as disclosed in Japanese Unexamined Publication Pat. No. 62(1987)-16666, a long photomultiplier may be disposed along the main scanning line as the photoelectric read-out means for detecting the light emitted by the stimulable phosphor sheet 2.

After image read-out from the stimulable phosphor sheet 2 is finished at the light beam scanning section 20, the stimulable phosphor sheet 2 is conveyed by the circulation and conveyance means 10 in the directions as indicated by the arrows A6 and A7 to the erasing section 30. A distribution means 11 is disposed between the light beam scanning section 20 and the erasing section 30. At the time the stimulable phosphor sheet 2 is thus conveyed, the distribution means 11 is maintained at the position as indicated by the solid line in FIG. 1 and guides the stimulable phosphor sheet 2 to the erasing section 30.

At the erasing section 30, radiation energy remaining on the stimulable phosphor sheet 2 after the image read-out therefrom is finished is erased. Specifically, a part of the radiation energy stored on the stimulable phosphor sheet 2 at the image recording step remains stored thereon after the image read-out is carried out. In order to reuse the stimulable phosphor sheet 2, the residual radiation energy is erased at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the stimulable phosphor sheet 2 is exposed to the erasing light emitted by the erasing light sources 31, 31, . . . for releasing the residual radiation energy from the stimulable phosphor sheet 2 while the stimulable phosphor sheet 2 is being conveyed in the direction as indicated by the arrow A8. At the erasing section 30, any known erasing method may be used. For example, erasing may be conducted by heating or by a combination of exposure to the erasing light with heating.

After the erasing of the residual radiation energy on the stimulable phosphor sheet 2 is finished at the erasing section 30, the stimulable phosphor sheet 2 is conveyed by the circulation and conveyance means 10 in the directions as indicated by the arrows A9 and A10 to the image recording section 50 and is reused for image recording.

On the other hand, at the time the image read-out from the stimulable phosphor sheet 2 has been finished at the light beam scanning section 20 and conveyed out of the light beam scanning section 20, a single recording sheet 3 is taken by a suction means 41 out of the recording sheet feeding magazine 4 held at the recording sheet feeding section 40. This embodiment is provided with a recording sheet housing section 60 for releasably holding a recording sheet housing magazine 6 in which the recording sheets 3, 3, . . . passing through the light beam scanning section 20 are to be housed, and a recording sheet conveyance means 70 for receiving the recording sheet 3 fed out of the recording sheet feeding section 40 and conveying the recording sheet 3 to the light beam scanning section 20 and the recording sheet housing section 60. The recording sheet 3 taken out of the recording sheet feeding magazine 4 in the manner as mentioned above is transferred to the recording sheet conveyance means 70 in the vicinity of the recording sheet feeding magazine 4. The recording sheet conveyance means 70 receives and conveys the recording sheet 3 in the directions as indicated by the arrows B1 and B2 to the light beam scanning section 20. A part of the recording sheet conveyance means 70 is common to the circulation and conveyance means 10.

At the light beam scanning section 20, the recording sheet 3 is conveyed in the direction as indicated by the arrow B3, and the radiation image which was read out of the stimulable phosphor sheet 2 is reproduced on the recording sheet 3 while the recording sheet is being thus conveyed. Specifically, at the time the recording sheet 3 is thus conveyed in the light beam scanning section 20, the light modulator 26 at the light beam scanning section 20 is operated in accordance with the image signals which were detected from the stimulable phosphor sheet 2 and processed and stored in the memory 29, and the operation of the photodetector 22b is stopped. The recording sheet 3 is scanned by the laser beam 21 now acting as the recording light modulated by the light modulator 26 and deflected by the light deflector 24, so that the radiation image which was stored on the stimulable phosphor sheet 2 is reproduced over the overall surface of the recording sheet 3.

Figure 2:
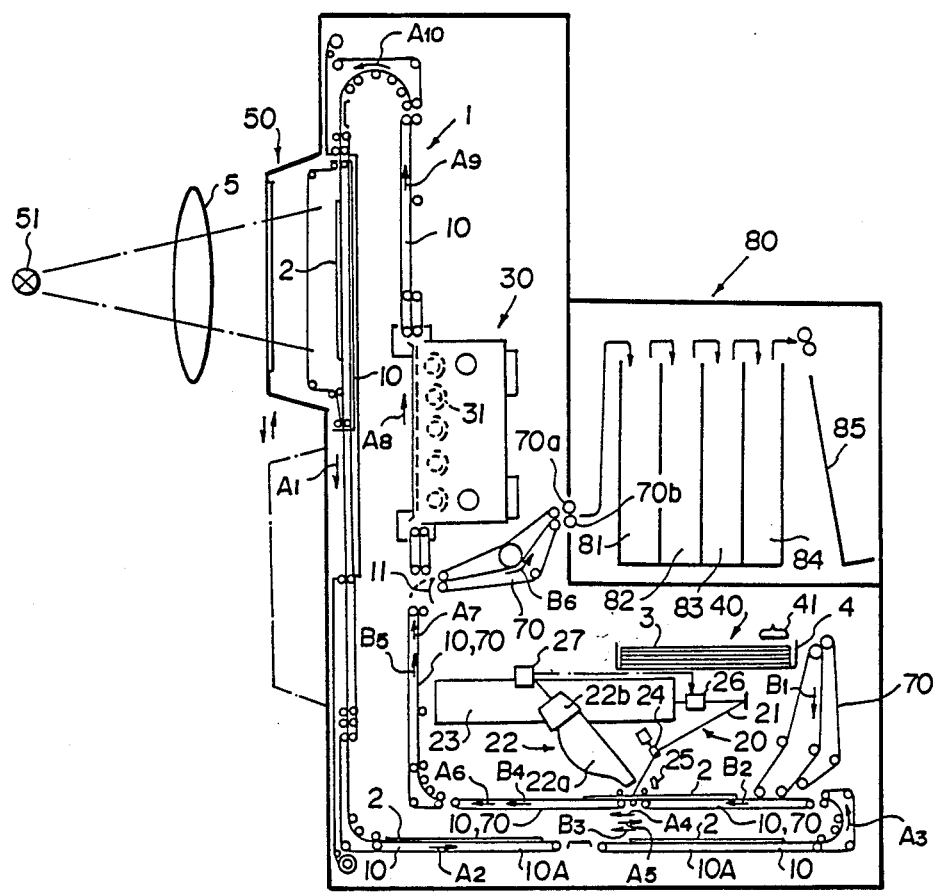
FIG. 2 is a schematic side view showing another embodiment of the radiation image recording, read-out and reproducing apparatus in accordance with the present invention.

After the image reproduction on the recording sheet 3 is finished at the light beam scanning section 20, the recording sheet 3 is conveyed by the recording sheet conveyance means 70 in the directions as indicated by the arrows B4 and B5 into the recording sheet housing section 60. At this time, the distribution means 11 is rotated to the position as indicated by the broken line in FIG. 1, and guides the recording sheet 3 to the recording sheet housing section 60. After the recording sheers 3, 3, . . . are thus housed in the recording sheet housing magazine 6 at the recording sheet housing section 60, the magazine 6 is taken out of the apparatus and loaded to an automatic developing machine. As shown in FIG. 2, the radiation image recording, read-out and reproducing apparatus in accordance with the present invention may adjoin an automatic developing machine 80, and an end of the recording sheet conveyance means 70 may be connected with the automatic developing machine 80. Specifically, the recording sheet conveyance means 70 conveys the recording sheet 3 on which the radiation image has been reproduced at the light beam scanning section 20 in the directions as indicated by the arrows B4, B5 and B6, and nip rollers 70a and 70b at the end of the recording sheet conveyance means 70 convey the recording sheet 3 into the automatic developing machine 80. In the automatic developing machine 80, the recording sheet 3 is subjected to development processing by being sent sequentially through a developing zone 81, a fixing zone 82, a washing zone 83 and a drying zone 84, and is then housed in a tray 85. Alternatively, the radiation image recording, read-out and reproducing apparatus in accordance with the present invention may be provided therein with an automatic developing means.

With the aforesaid embodiment wherein the image read-out from the stimulable phosphor sheet 2 and the image reproduction on the recording sheet 3 are carried out by commonly utilizing the main scanning means and the sub-scanning means at the light beam scanning section 20, the radiation image recording and reproducing system as a whole can be made smaller and the manufacturing cost can be made lower than in the case where a recording and read-out apparatus and a reproducing apparatus are provided independently of each other as in the conventional system. Also, the radiation image recording, read-out and reproducing apparatus in accordance with the present invention can be loaded on a mobile X-ray diagnostic station such as a traveling X-ray diagnostic station in the form of a vehicle like a bus for the purpose of mass medical examinations or the like in the same manner as the conventional recording and read-out apparatus. Therefore, the radiation image read out from the stimulable phosphor sheet 2 can be immediately reproduced on the recording sheet 3 at the time of medical examinations.

In the aforesaid embodiment, both the sub-scanning means and the main scanning means are utilized in common for the image read-out as well as the image reproduction at the light beam scanning section. However, the read-out main scanning means and the reproducing main scanning means may be provided independently of each other. Also, in the read-out main scanning means and the reproducing main scanning means, a single light deflector may be utilized for both means, the read-out light source and the reproduction light source may be provided independently of each other, and the optical path may be changed over by use of a mirror or the like. Also, in the aforesaid embodiment, reproduction of the radiation image read out from a single stimulable phosphor sheet 2 is carried out on a single recording sheet 3, by way of example, immediately after the image read-out is carried out on the stimulable phosphor sheet 2. Instead, the capacity of the memory 29 may be increased, the image read-out may be carried out continuously for a plurality of the stimulable phosphor sheets 2, 2, . . . at the light beam scanning section 20, image signals thus detected may be stored in the memory 29, and then the image reproduction may be carried out continuously on a plurality of the recording sheets 3, 3, . . . . Also, instead of reproducing all of the read-out radiation images as hard copies on the recording sheets 3, 3, . . . , the radiation images may be displayed on a display device such as a CRT, and only the necessary images may be reproduced as hard copies on the recording sheets 3, 3, . . . . Further, a comparatively long time is taken for carrying out the image read out at the light beam scanning section and, in the case where the image reproduction on the recording sheet 3 is carried out each time the image read-out from a single stimulable phosphor sheet 2 is finished, a longer time is required between the sending of a preceding stimulable phosphor sheet 2 to the light beam scanning section 20 and the sending of the next stimulable phosphor sheet 2 to the light beam scanning section 20. Accordingly, as shown in FIGS. 1 and 2, a waiting zone 10A wherein the stimulable phosphor sheets 2, 2, . . . are to wait for processing should preferably be provided on the circulation and conveyance means 10 between the image recording section 50 and the light beam scanning section 20, and the positions of the stimulable phosphor sheets 2, 2, . . . conveyed and circulated should preferably be adjusted so that they do not overlap upon one another. Instead of the waiting zone 10A, the conveyance path may be provided with a stacker or the like for holding a plurality of the image-recorded stimulable phosphor sheets 2, 2, . . . therein therein and feeding them one by one to the light beam scanning section 20.

Also, the recording sheet used in the radiation image read-out and reproducing apparatus in accordance with the present invention is not limited to the silver halide photographic film on which an image is reproduced by means of light and the reproduced image is developed by use of a wet automatic developing machine (section), and may be a heat-sensitive recording sheet, a heat development photosensitive material, an instant film or the like. For example, in the case where the recording sheet is a heat-sensitive recording sheet on which image reproduction is effected by means of the heat of a laser beam, the configuration of the light beam scanning section may be identical with that in the aforesaid embodiments, and the automatic developing machine (section) becomes unnecessary. Therefore, the recording sheet housing section 60 as shown in FIG. 1 may be provided, and the recording sheets on which images have been reproduced may be stacked in a tray or the like. In the case where the heat-sensitive recording sheet is of the type wherein image fixing is effected by exposure to light after the thermal image reproduction, image fixing may be carried out by providing a light irradiation means in the recording sheet conveyance path between the light beam scanning section and the recording sheet housing section. Also, the aforesaid erasing section may be disposed prior to the recording sheet housing section and also utilized as the light irradiation means.

Figure 3:
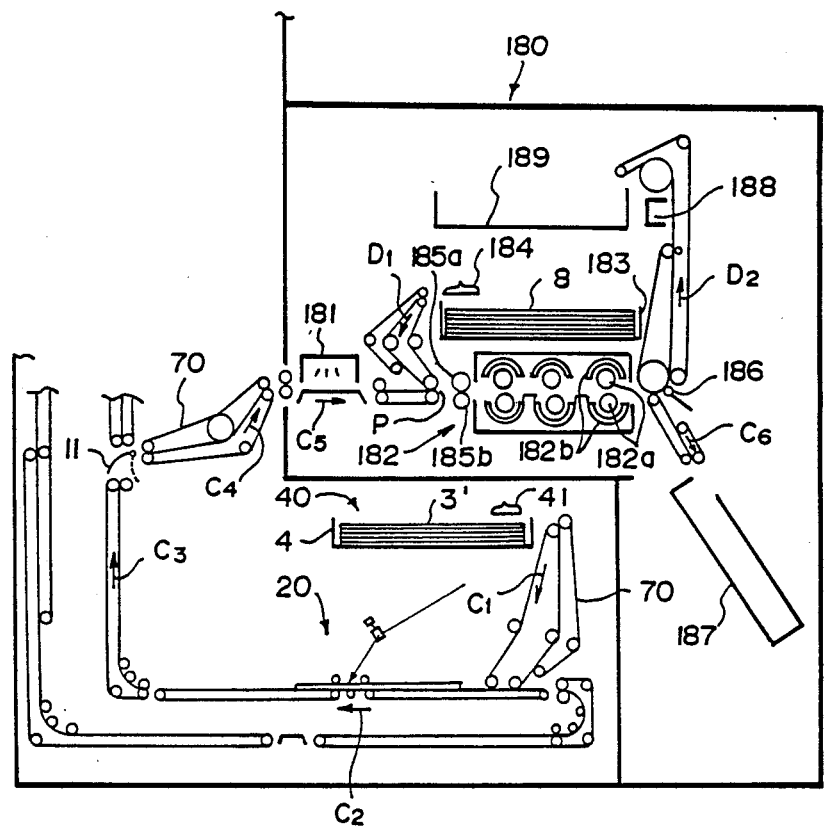
FIGS. 3 and 4 are schematic views showing the parts in the vicinity of the light beam scanning section in further embodiments of the radiation image recording, read-out and reproducing apparatus in accordance with the present invention.

FIG. 3 shows an example of the configuration in the vicinity of the light beam scanning section formed in the case where a heat development photosensitive material as disclosed in Japanese Unexamined Publication Pat. No. 61(1986)-147244 is used as the recording sheet. The configuration of the embodiment shown in FIG. 3 is equivalent to the configuration as shown in FIG. 2 except that the automatic developing machine 80 shown in FIG. 2 is replaced by a heat development machine as will be described later, and the configurations of the light beam scanning section and the like are the same as in the embodiment shown in FIG. 2.

With reference to FIG. 3, a recording sheet feeding section 40 above the light beam scanning section 20 is loaded with a magazine 4 in which a plurality of heat development photosensitive sheets 3', 3', . . . as the recording sheets are housed. When the image read-out from the stimulable phosphor sheet 1 is finished at the light beam scanning section 20, the heat development photosensitive sheets 3', 3', . . . are fed one by one out of the magazine 4 by a suction means 41, and transferred to a recording sheet conveyance means 70 in the vicinity of the recording sheet feeding section 40. The heat development photosensitive sheet 3' is conveyed by the recording sheet conveyance means 70 in the direction as indicated by the arrow C1 into the light beam scanning section 20, and is scanned with a laser beam 21 for image reproduction while the heat development photosensitive sheet 3' is being conveyed in the direction as indicated by the arrow C2 at the light beam scanning section 20. Thereafter, the heat development photosensitive sheet 3' is conveyed by the recording sheet conveyance means 70 in the direction as indicated by the arrow C3, and is further conveyed in the direction as indicated by the arrow C4 into a developing machine 180 by being guided by the distribution means 11 moved to the position as indicated by the solid line.

In the developing machine 180, the heat development photosensitive sheet 3' is first passed through a water application means 181 in the direction as indicated by the arrow C5 and is imparted with water as an image forming solvent. Then, the heat development photosensitive sheet 3' is sent to a heat development transfer means 182 whose inside is constituted as a heating means. Prior to the sending thereto, the heat development photosensitive sheet 3' is put into close contact with an image receiving sheet 8. Specifically, a magazine 183 in which a plurality of the image receiving sheets 8, 8, . . . are housed is held above the heat development transfer means 182. A single image receiving sheet 8 is fed out of the magazine 183 by a suction means 184 and conveyed in the direction as indicated by the arrow D1, with the process timed so that the leading edge of the image receiving sheet 8 coincides with the leading edge of the heat development photosensitive sheet 3', which is being conveyed out of the water application means 181, at a position P. The heat development photosensitive sheet 3' and the image receiving sheet 8 are put into close contact with each other by nip rollers 185a and 185b, and sent in the condition of close contact to the heat development transfer means 182.

At the heat development transfer means 182, development of the heat development photosensitive sheet 3' and image transfer to the image receiving sheet 8 are carried out while the two sheets are being conveyed rightward in the condition of close contact by three pairs of nip rollers 182a, 182a, 182a and heated. As the heating means at the heat development transfer means 182, heaters 182b, 182b, . . . constituted by electric heating elements are disposed close to the nip rollers 182a, 182a, 182a and increase the temperature inside of the heat development transfer means 182 to a predetermined value. After the development and image transfer are finished at the heat development transfer means 182, the two sheets are separated from each other by a separation means 186 provided close to the outlet of the heat development transfer means 182, and the heat development photosensitive sheet 3' is conveyed in the direction as indicated by the arrow C6 into a waste photosensitive sheet housing box 187. On the other hand, the image receiving sheet 8 is conveyed in the direction as indicated by the arrow D2, dried at a drying means 188, and then conveyed into a take-out tray 189.

In the case where the heat development photosensitive sheet is used as the recording sheet, a heat development apparatus may not be connected with the radiation image recording, read-out and reproducing apparatus and may be formed independently thereof, the heat development photosensitive sheet on which an image has been reproduced at the light beam scanning section may be housed in a tray, and the tray may be taken out of the radiation image recording, read-out and reproducing apparatus and loaded on to the heat development apparatus. Also, though the embodiment shown in FIG. 3 is provided with the developing section applied to the case where the heat development photosensitive sheet and the image receiving sheet are different from and independent of each other, a mono-sheet type heat development material comprising a substrate, and a heat development photosensitive material layer and an image receiving material layer overlaid on the substrate may also be used. In this case, the development transfer means alone may be provided as the developing section, and therefore the apparatus can be made smaller.

Figure 4:
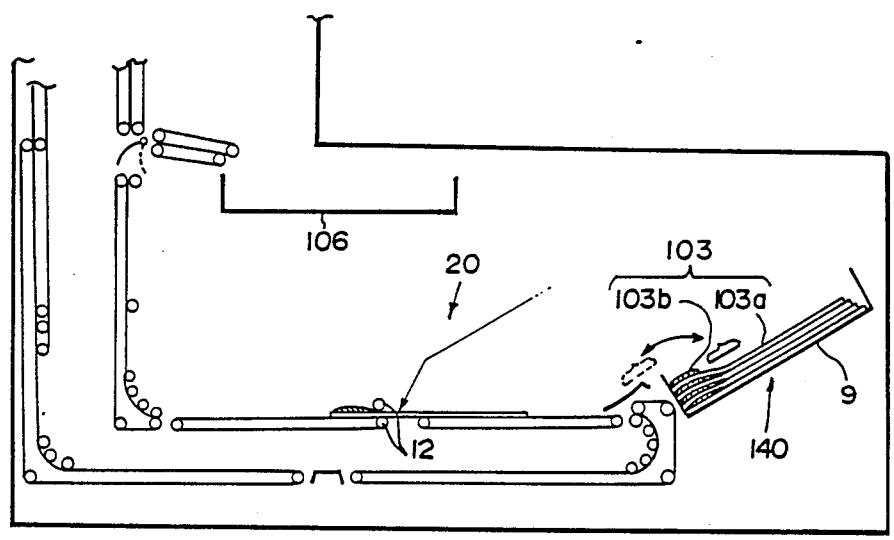

Also, as shown in FIG. 4, an instant film unit 103 comprising a photosensitive sheet member 103a and a developing solution containing member 103b formed integrally with each other may be used as the recording sheet. In the case where the instant film unit 103 is used, conveyance of the instant film unit 103 should be carried out without the unit 103 being grasped prior to the development position so that the developing solution containing member 103b does not collapse before its arrival at the development position. Therefore, by way of example, a recording sheet feeding section 140 may be provided in the horizontal relation to the light beam scanning section 20 as shown in FIG. 4. The instant film unit 103 fed out of a magazine 9 at the recording sheet feeding section 140 is conveyed to the light beam scanning section 20. At the light beam scanning section 20, image reproduction by the laser beam 21 is carried out, the developing solution containing member 103b at the leading edge portion of the instant film unit 103 is made to collapse by nip rollers 12, and the developing solution is spread over the photosensitive sheet member 103a. As the photosensitive sheet member 103a passes between the nip rollers 12, the developing solution spreads over the sheet surface. Therefore, the photosensitive sheet member 103a is developed sequentially starting with the part at which the image reproduction has been finished. The photosensitive sheet member 103a is completely passed between the nip rollers 12, and the instant film unit 103 on which the development has been finished in this manner is conveyed into a film unit housing tray 106.

Besides the aforesaid unit type instant film, a peel-apart type instant film wherein a cover sheet on its surface is peeled off after development may also be used.

We claim:

1. A radiation image recording, read-out and reproducing apparatus which comprises:
   (i) a circulation and conveyance means for conveying at least one stimulable phosphor sheet along a predetermined circulation path,
   (ii) a recording sheet feeding section for housing recording sheets and feeding out said housed recording sheets one by one,
   (iii) an image recording section disposed on said circulation path for recording a radiation image on said stimulable phosphor sheet by exposing said stimulable phosphor sheet to a radiation carrying image information,
   (iv) a light beam scanning section disposed on said circulation path and provided with a read-out main scanning means for deflecting a light beam by a light deflector and scanning said light beam in a main scanning direction on said stimulable phosphor sheet, a reproducing main scanning means for deflecting a light beam by a light deflector and scanning said light beam in the main scanning direction on said recording sheet, and a sub-scanning means for scanning said stimulable phosphor sheet and said recording sheet respectively in a sub-scanning direction by moving them in the sub-scanning direction approximately normal to said main scanning direction, wherein read-out of said radiation image is carried out by causing said stimulable phosphor sheet to emit light carrying said radiation image by the light beam in said read-out main scanning means and detecting the emitted light by use of a light detection means, and reproduction of said radiation image on said recording sheet is carried out by modulating the light beam in said reproducing main scanning means in accordance with said radiation image thus read out, said read-out and said reproduction occurring at the same location along said circulation path.

(v) an erasing section disposed on said circulation path for, prior to the next image recording on said stimulable phosphor sheet for which the image read-out has been carried out at said light beam scanning section, having said stimulable phosphor sheet release the radiation energy remaining on said stimulable phosphor sheet, and (vi) a recording sheet conveyance means for receiving said recording sheet fed out of said recording sheet feeding section, conveying said recording sheet to said light beam scanning section, and thereafter conveying said recording sheet out of said light beam scanning section in a direction different from the direction of conveyance of said circulation and conveyance means.

2. An apparatus as defined in claim 1 wherein said light deflector of said read-out main scanning means and said light deflector of said reproducing main scanning means are common to each other.

3. An apparatus as defined in claim 2 wherein a light source for said light beam of said read-out main scanning means and a light source for said light beam of said reproducing main scanning means are common to each other.

4. An apparatus as defined in claim 1 wherein at least a part of said circulation and conveyance means and at least a part of said recording sheet conveyance means are common to each other.

5. An apparatus as defined in claim 1 wherein an end of said recording sheet conveyance means is connected with an automatic developing machine, and said recording sheet conveyance means conveys said recording sheet from said light beam scanning section to said automatic developing machine.

* * * * *